(12) United States Patent
Otera (10) Patent No.: US 12,504,822 B2
(45) Date of Patent: Dec. 23, 2025

(54) VIBRATION DEVICE

(71) Applicant: Murata Manufacturing Co., Ltd., Nagaokakyo (JP)

(72) Inventor: Shozo Otera, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 926 days.

(21) Appl. No.: 17/718,688

(22) Filed: Apr. 12, 2022

(65) Prior Publication Data

US 2022/0246825 A1 Aug. 4, 2022

Related U.S. Application Data

(63) Continuation of application No. PCT/JP2021/007827, filed on Mar. 2, 2021.

(30) Foreign Application Priority Data

Mar. 6, 2020 (JP) .................................. 2020-038359

(51) Int. Cl.
*G06F 3/01* (2006.01)
*G06F 3/041* (2006.01)
*H10N 30/87* (2023.01)
*H10N 30/88* (2023.01)

(52) U.S. Cl.
CPC .............. *G06F 3/016* (2013.01); *G06F 3/041* (2013.01); *G06F 3/0414* (2013.01); *H10N 30/87* (2023.02); *H10N 30/88* (2023.02)

(58) Field of Classification Search
CPC ........ G06F 3/016; G06F 3/041; G06F 3/0414; G06F 3/03547; G06F 3/044; H10N 30/87; H10N 30/88; H10N 30/704; B06B 1/06
See application file for complete search history.

(56) References Cited

U.S. PATENT DOCUMENTS

| 5,982,304 A | 11/1999 | Selker et al. | |
|---|---|---|---|
| 2011/0132114 A1* | 6/2011 | Siotis | H02K 7/063 74/87 |
| 2019/0155391 A1* | 5/2019 | Hashimoto | G06F 3/0412 |

FOREIGN PATENT DOCUMENTS

| JP | H10307661 A | 11/1998 |
| JP | 2006165318 A | 6/2006 |
| JP | 2016071451 A | 5/2016 |
| WO | 2019013164 A1 | 1/2019 |

OTHER PUBLICATIONS

International Search Report issued for PCT/JP2021/007827, date of mailing May 11, 2021.

* cited by examiner

*Primary Examiner* — Thomas Truong
(74) *Attorney, Agent, or Firm* — ArentFox Schiff LLP (57) ABSTRACT

A vibration device that includes: a vibration part having a flat plate shape and connected to an operation target on which a user performs a pushing operation; a fixing member; a support part connecting the vibration part and the fixing member; and a vibration film connected to the vibration part and the fixing member, extending across the vibration part and the fixing member in a tensioned state, and constructed to vibrate in a planar direction.

12 Claims, 7 Drawing Sheets

VIBRATION DEVICE

CROSS REFERENCE TO RELATED APPLICATIONS

The present application is a continuation of International application No. PCT/JP2021/007827, filed Mar. 2, 2021, which claims priority to Japanese Patent Application No. 2020-038359, filed Mar. 6, 2020, the entire contents of each of which are incorporated herein by reference.

FIELD OF THE INVENTION

The present invention relates to a vibration device that generates vibrations.

BACKGROUND OF THE INVENTION

In recent years, there has been proposed a tactile sense presentation device that transmits vibrations when a user performs a pushing operation on an input device, such as a touch panel, to allow the user to feel the push.

For example, Patent Document 1 proposes a tactile sense presentation device that uses a piezoelectric film to give tactile feedback to a user. The piezoelectric film expands and contracts in a planar direction in response to voltage application. When the piezoelectric film expands and contracts, a vibration part connected to the piezoelectric film vibrates in the planar direction.

Patent Document 1: WO 2019/013164 A

SUMMARY OF THE INVENTION

In order for the user to comfortably obtain the tactile feedback, a vibration frequency is important. For example, when vibrations are generated at a frequency of about 100 to 200 Hz, the user can comfortably obtain the tactile feedback.

Meanwhile, the vibration part disclosed in Patent Document 1 has a flat plate shape, is thin, and is light. When the vibration part is light, a resonance frequency is high, so that the vibration frequency is likely to be high.

Therefore, an object of the present invention is to provide a vibration device capable of producing a low vibration frequency when a flat plate-shaped vibration part is vibrated.

A vibration device that includes: a vibration part having a flat plate shape and connected to an operation target on which a user performs a pushing operation; a fixing member; a support part connecting the vibration part and the fixing member; and a vibration film connected to the vibration part and the fixing member, extending across the vibration part and the fixing member in a tensioned state, and constructed to vibrate in a planar direction.

In this manner, the vibration part is connected to the operation target (for example, a touch panel) heavier than the vibration part, and thus, a resonance frequency decreases. Therefore, the vibration device can have a low vibration frequency.

According to the present invention, the vibration frequency can be made low when the flat plate-shaped vibration part is vibrated.

DETAILED DESCRIPTION OF THE INVENTION

Figure 1A:
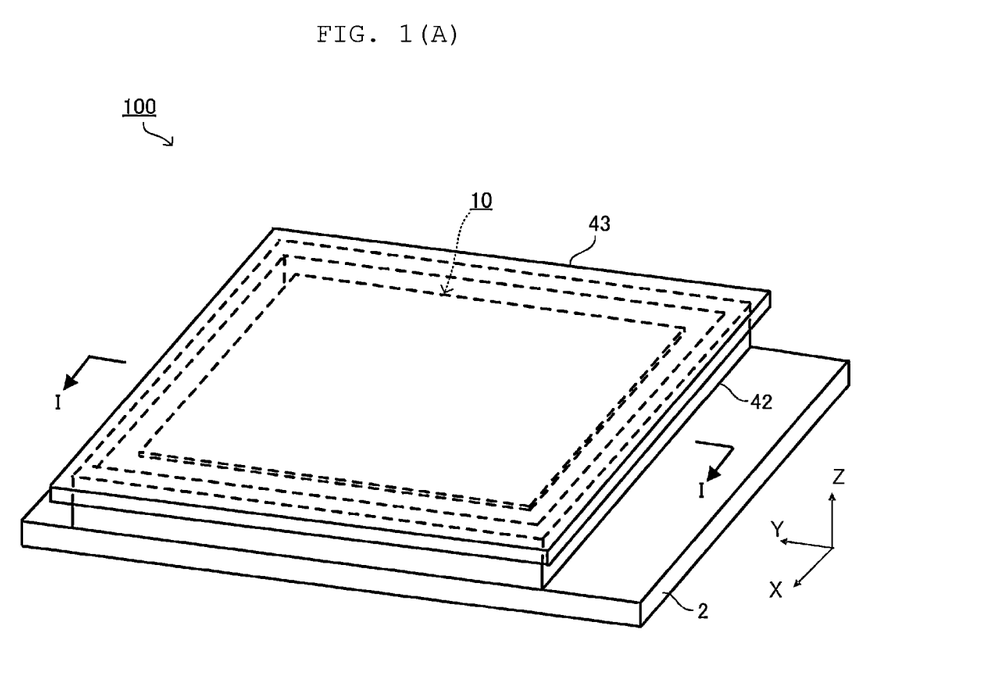
FIG. 1(A) is a perspective view of a vibration device 100.
Figure 1B:
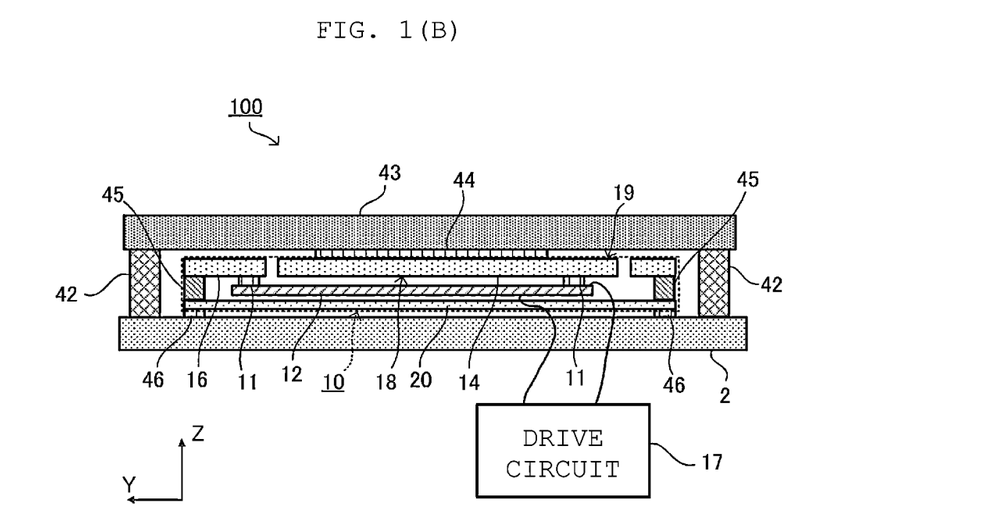
FIG. 1(B) is a sectional view taken along line I-I illustrated in FIG. 1(A).
Figure 2A:
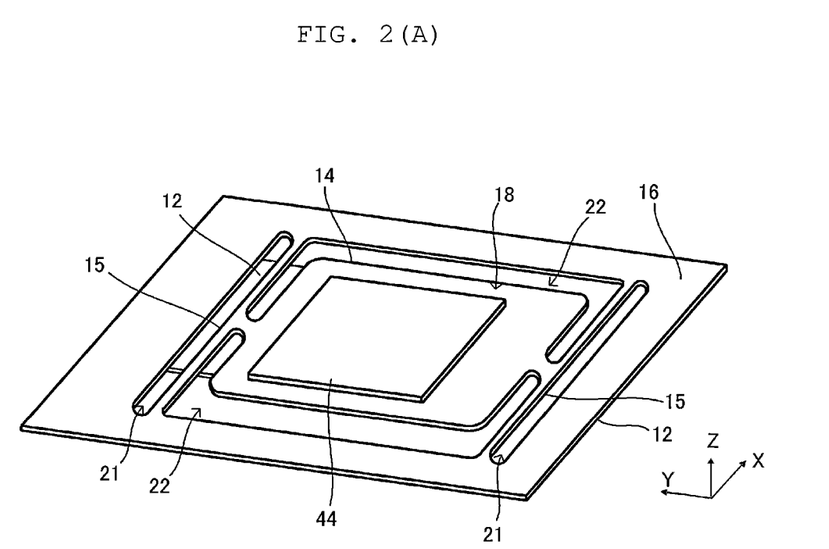
FIG. 2(A) is a top perspective view of a vibration unit 10.
Figure 2B:
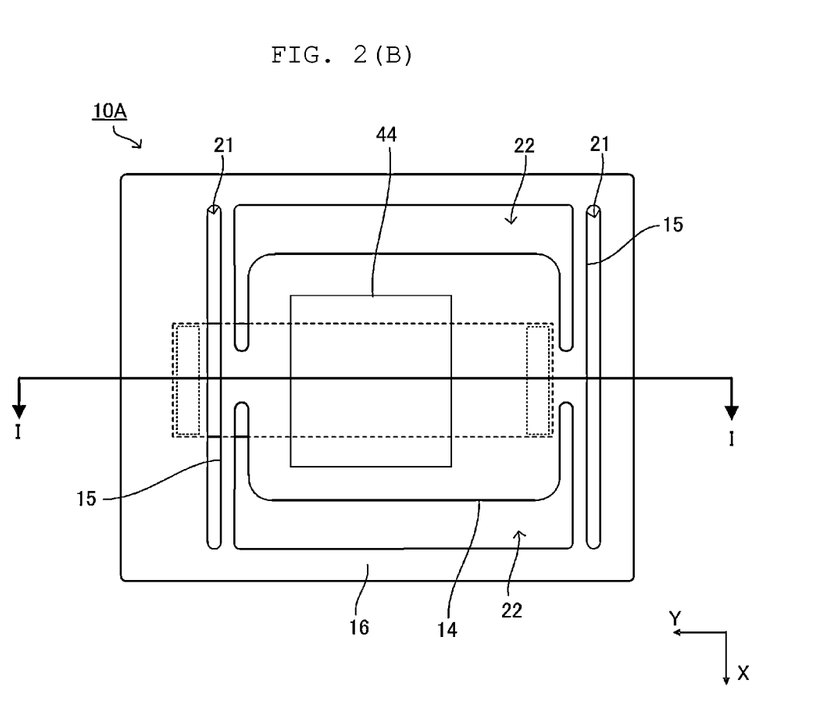
FIG. 2(B) is a plan view thereof.
Figure 3A:
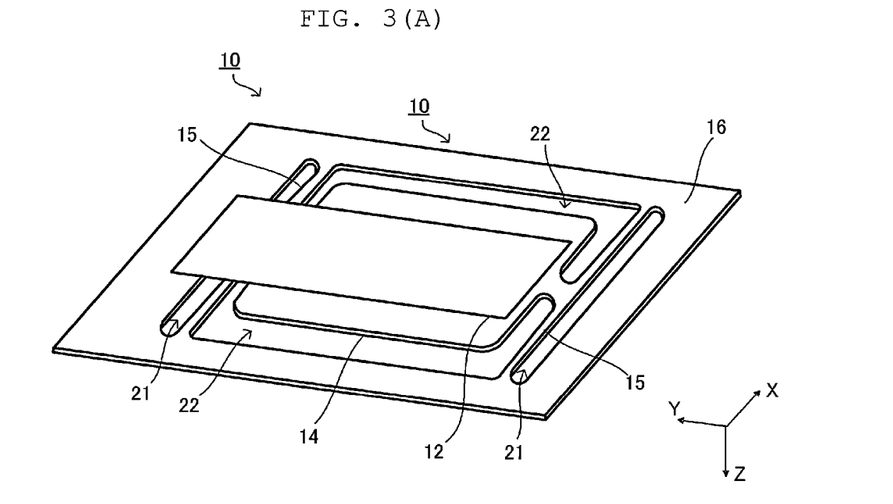
FIG. 3(A) is a rear perspective view of the vibration unit 10.
Figure 3B:
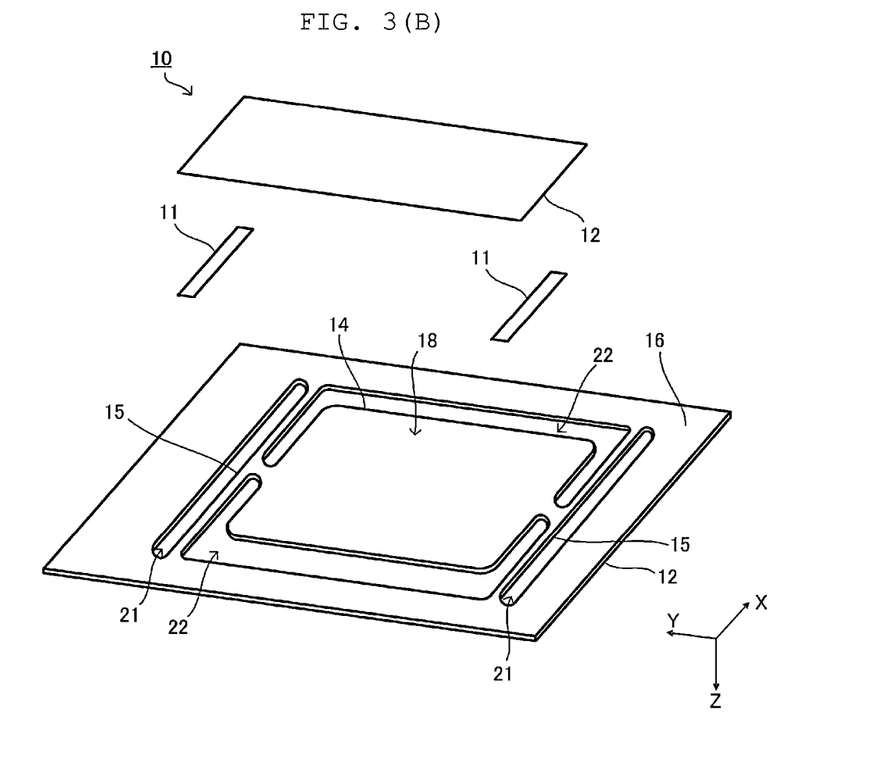
FIG. 3(B) is an exploded perspective view of the vibration unit 10.

FIG. 1(A) is a perspective view of a vibration device 100, and FIG. 1(B) is a sectional view taken along line I-I illustrated in FIG. 1(A). FIG. 2(A) is a top perspective view of a vibration unit 10, and FIG. 2(B) is a plan view thereof. FIG. 3(A) is a rear perspective view of the vibration unit 10, and FIG. 3(B) is an exploded perspective view of the vibration unit 10.

Note that FIG. 1(A) illustrates the touch panel 43 transparently and indicates other members overlapping with a touch panel 43 by broken lines. FIG. 1(B) illustrates a state in which the vibration device 100 is installed in a housing 2. In addition, a width direction, a length direction, and a thickness direction of the vibration device 100 are referred to as an X-axis direction, a Y-axis direction, and a Z-axis direction, respectively.

The vibration device 100 of the present embodiment includes the vibration unit 10, a drive circuit 17, a cushioning material 42, a touch panel 43, a connection member 44, and a connection member 46.

The vibration device 100 is installed in the housing 2 of an electronic device or the like, for example. An upper surface of a vibration part 14 in the vibration unit 10 is connected to the touch panel 43 through the connection member 44. In addition, a lower surface of a frame member 16 of the vibration unit 10 is connected to the housing 2 through the connection member 46. The connection member 44 and the connection member 46 are configured using, for example, a double-sided tape.

The touch panel 43 is an example of an operation target on which a user performs a pushing operation. The touch panel 43 is connected to the housing 2 through the cushioning material 42. The cushioning material 42 is made of, for example, a foaming agent, and is made of a material that is more easily deformed at the time of receiving an external force than the connection member 44 and the connection member 46. Therefore, the touch panel 43 is not strongly restrained with respect to the housing 2, and is fixed to the housing 2 in a state of easily vibrating.

The vibration unit 10 includes a connection member 11, a vibration film 12, the vibration part 14, a support part 15, the frame member 16, a connection member 45, and a protective film 20. The vibration part 14, the support part 15, and the frame member 16 form a rectangular flat plate as a whole. Each of the vibration part 14, the support part 15, and the frame member 16 has a first main surface 18 and a second main surface 19.

The frame member 16 is an example of a fixing member, and has a rectangular shape in plan view. The frame member 16 has two first openings 21 and two second openings 22. The first openings 21 are arranged on both end sides in the Y-axis direction. The second openings 22 are arranged on both end sides in the X-axis direction. The first opening 21 has a substantially rectangular shape that is long in the X-axis direction in plan view. The second opening 22 has a substantially rectangular shape that is long in the Y-axis direction in plan view. In addition, both ends of the second opening 22 in the Y-axis direction are further extended in a rectangular shape toward a central axis of the frame member 16 (line I-I in FIG. 2(B)).

The vibration part 14 has a rectangular shape in plan view, and is arranged inside the frame member 16. The vibration part 14 is long in the Y-axis direction and short in the X-axis direction. In addition, the vibration part 14 may be long in the X-axis direction and short in the Y-axis direction. The area of the vibration part 14 is smaller than the area of a portion surrounded by the frame member 16. The connection member 44 is pasted to the upper surface of the vibration part 14. The upper surface of the vibration part 14 is connected to the touch panel 43 through the connection member 44.

The support part 15 connects the vibration part 14 and the frame member 16. The support part 15 supports the vibration part 14 against the frame member 16. The support part 15 has a rectangular shape that is long in the X-axis direction, and supports the vibration part 14 at both end portions of the vibration part 14 in the Y-axis direction. The support part 15 has a length in the X-axis direction being longer than a length in the Y-axis direction.

The frame member 16, the vibration part 14, and the support part 15 are formed using the same material (for example, acrylic resin, PET, polycarbonate, glass epoxy, FRP, metal, glass, or the like). The metal includes, for example, stainless steel (SUS). The metal may be coated with a resin such as polyimide and insulated as necessary.

The frame member 16, the vibration part 14, and the support part 15 are formed by punching one plate-like member having a rectangular shape along shapes of the first opening 21 and the second opening 22. Of course, the frame member 16, the vibration part 14, and the support part 15 may be separate materials. However, the frame member 16, the vibration part 14, and the support part 15 can be easily manufactured by being formed using the same material. Alternatively, it is unnecessary to use another material such as rubber (a member having creep deterioration) to support the vibration part 14 by forming the frame member 16, the vibration part 14, and the support part 15 using the same material. Thus, the frame member 16 can stably hold the vibration part 14 for a long period of time.

The vibration film 12 is connected to the frame member 16 and the vibration part 14 through the connection member 11. The vibration film 12 is connected to the frame member 16 and the first main surface 18 side of the vibration part 14. A first end of the vibration film 12 in a longitudinal direction is connected to a first end of the frame member 16 in the Y-axis direction. A second end of the vibration film 12 is connected to a second end of the vibration part 14 in the Y-axis direction. The connection member 11 is configured using, for example, a double-sided tape.

The vibration film 12 is an example of a film that vibrates by being deformed in a planar direction when a voltage of a certain frequency is applied. The vibration film 12 is configured using, for example, a piezoelectric film. More specifically, the vibration film 12 is made of, for example, polyvinylidene fluoride (PVDF). However, the vibration film 12 may be, for example, a chiral polymer. The chiral polymer contains polylactic acid. The polylactic acid includes poly-L-lactic acid (PLLA), poly-D-lactic acid (PDLA), or the like.

Electrodes (not illustrated) are formed on both main surfaces of the vibration film 12. The drive circuit 17 is connected to the electrodes on both the main surfaces of the vibration film 12. The drive circuit 17 applies a voltage to the electrodes on both the main surfaces of the vibration film 12. The vibration film 12 expands and contracts in the planar direction in response to the applied voltage. Note that the polylactic acid undergoes shear deformed in response to the applied voltage. Therefore, when the polylactic acid is used for the vibration film 12, the expansion and contraction in the planar direction can be achieved by being cut such that each outer peripheral side is about 45°±10° with respect to a stretching direction of the vibration film 12.

The connection member 11 has a rectangular shape that is long in a lateral direction of the frame member 16 in plan view. The connection member 11 has a certain thickness. The connection member 11 connects the vibration film 12 and the vibration part 14 at a certain distance in the Z-axis direction so as not to bring the vibration film 12 into contact with the vibration part 14. As a result, the electrodes provided on both the main surfaces of the vibration film 12 do not come into contact with the vibration part 14. Therefore, the electrodes are not damaged even if the vibration film 12 expands and contracts so that the vibration part 14 vibrates.

When the vibration film 12 expands and contracts in the Y-axis direction, the vibration part 14 vibrates in the Y-axis direction. The touch panel 43 is connected to the vibration part 14, and thus, vibrates together with the vibration part 14. As a result, the vibrations generated in the vibration part 14 are transmitted to a user touching the touch panel 43.

Note that the configuration for vibrating the vibration part 14 is not limited to the vibration film 12. For example, the vibration part 14 may be vibrated using a motor.

The drive circuit 17 preferably applies a drive voltage at a frequency close to a resonance frequency. As a result, the vibration part 14 and the touch panel 43 can be efficiently vibrated. Assuming that a weight of the touch panel 43 is M, a weight of the vibration part 14 is m, a spring constant of the vibration film 12 is K, and a spring constant of the support part 15 is k, a resonance frequency F is expressed as $F=(1/2\pi)\cdot((K+k)/(M+m))^{1/2}$.

For example, if K+k=80,000 N/m, m=10 g, and M=20 g, the resonance frequency F is about 250 Hz. The resonance frequency F is a frequency at which a person can feel tactile feedback. Further, if m=10 g and M=100 g, the resonance frequency F is about 135 Hz, and it is possible to feel more preferable tactile feedback. Meanwhile, in a case where the frame member and the touch panel are connected as in a structure disclosed in WO 2019/013164 A, the resonance frequency F is determined by the weight m of the vibration part rather than the weight M of the touch panel. Therefore, for example, when K+k=80,000 N/m and m=10 g, the resonance frequency F is about 450 Hz, and the tactile feedback that can be felt is small if the frame member and the touch panel are connected.

In order for the user to comfortably obtain the tactile feedback, a vibration frequency is important. For example, when vibrations are generated at a vibration frequency of about 100 to 250 Hz, the user can comfortably obtain the tactile feedback. Since the touch panel 43 is connected to the vibration part 14 to vibrate the vibration part 14 and the touch panel 43 in the vibration unit 10 of the present embodiment, the resonance frequency F can be lowered to about 100 to 250 Hz as compared with a configuration in which only the vibration part 14 is vibrated. Therefore, the vibration unit 10 can give comfortable tactile feedback to the user.

Figure 4:
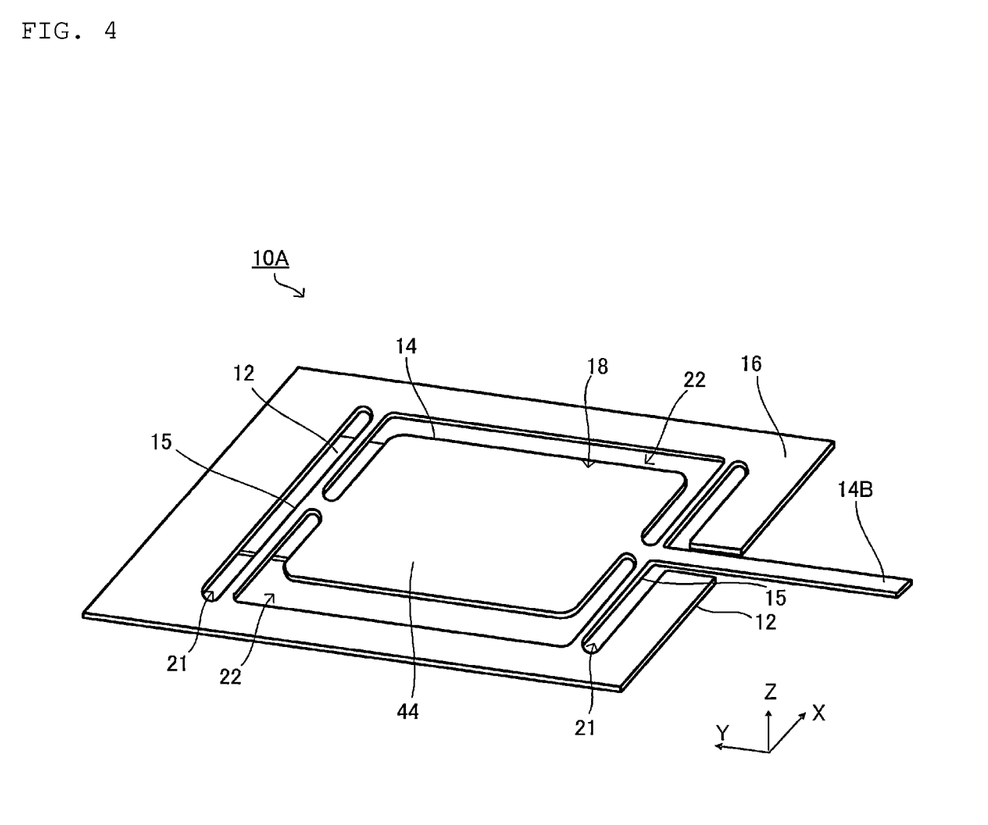
FIG. 4 is a top perspective view illustrating a structure of a vibration unit 10A according to a first modification.
Figure 5A:
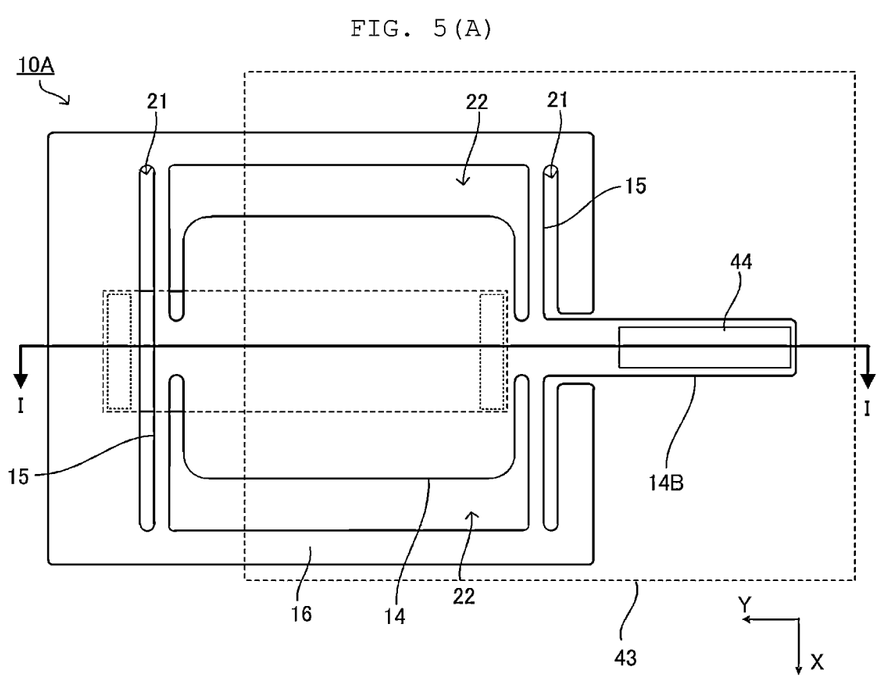
FIG. 5(A) is a top view of a touch panel 43, a connection member 44, and the vibration unit 10A.
Figure 5B:
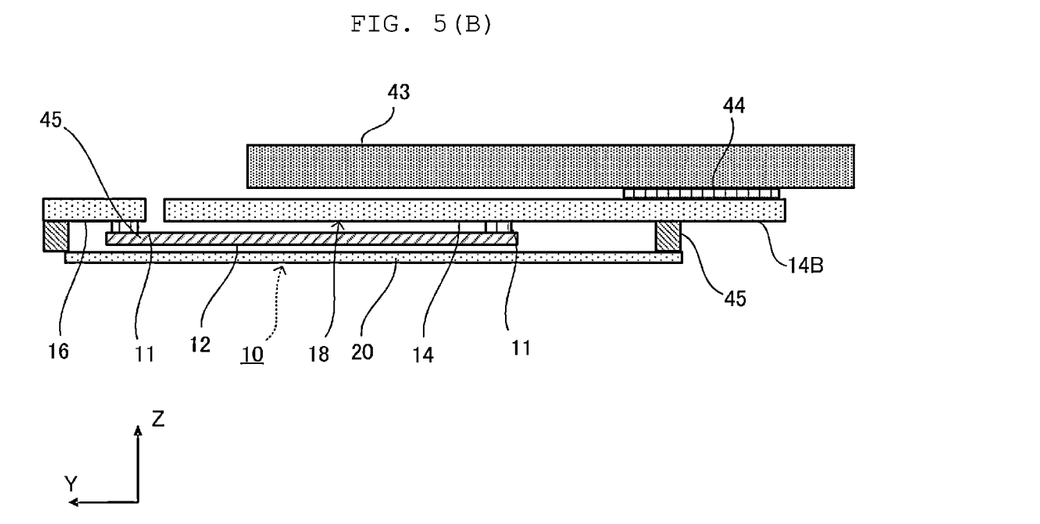
FIG. 5(B) is a partial sectional view.

Next, FIG. 4 is a top perspective view illustrating a structure of a vibration unit 10A according to a first modification. FIG. 5(A) is a top view of the vibration unit 10A. FIG. 5(A) illustrates the touch panel 43 transparently. FIG. 5(B) is a sectional view taken along line I-I illustrated in FIG. 5(A). Note that the same configuration as that of the vibration unit 10 will be denoted by the same reference symbol, and the description thereof will be omitted.

The vibration unit 10A includes an extension part 14B extending outward from the frame member 16. The extension part 14B is arranged on a second end side of the vibration part 14 to which the vibration film 12 is connected. That is, the vibration part 14 has a portion arranged inside the frame member 16 and the extension part 14B arranged outside the frame member 16.

The extension part 14B has a rectangular shape that is long in the Y-axis direction in plan view. In the frame member 16, a portion where the extension part 14B is arranged is open and is not connected to the extension part 14B. The frame member 16, the vibration part 14, the support part 15, and the extension part 14B may also be formed by punching one plate-like member. Of course, the frame member 16, the vibration part 14, the support part 15, and the extension part 14B may also be separate members.

The extension part 14B vibrates together with the portion of the vibration part 14 arranged inside the frame member 16. The extension part 14B is connected to the touch panel 43 through the connection member 44. Therefore, the touch panel 43 vibrates together with the vibration part 14.

The vibration unit 10 illustrated in FIG. 1(B) overlaps with the touch panel 43 in plan view. However, the vibration unit 10A illustrated in FIGS. 5(A) and 5(B) is connected to the touch panel by the extension part 14B. Therefore, configurations other than the extension part 14B do not need to overlap with the touch panel 43 in plan view. As a result, a length of the vibration film 12 in the Y-axis direction can be increased in the vibration unit 10A. As the length of the vibration film 12 in the Y-axis direction is increased, the amount of expansion and contraction when the same voltage is applied increases, and thus, the amplitude of the vibration part 14 can be increased. Thus, the vibration unit 10A can enhance tactile feedback with respect to a user.

Figure 6A:
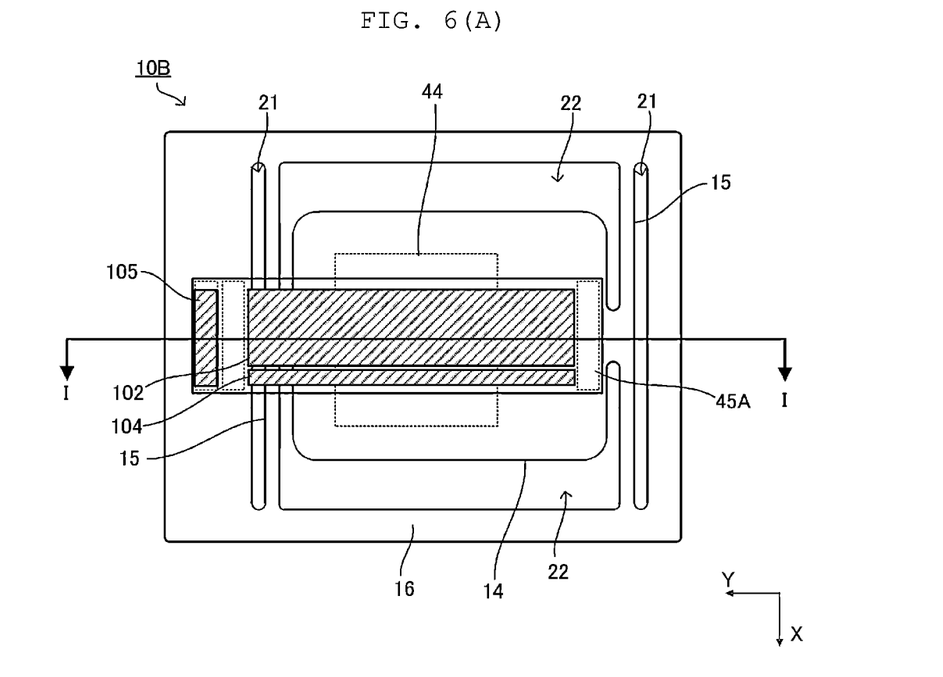
FIG. 6(A) is a bottom view of a vibration unit 10B according to a second modification.
Figure 6B:
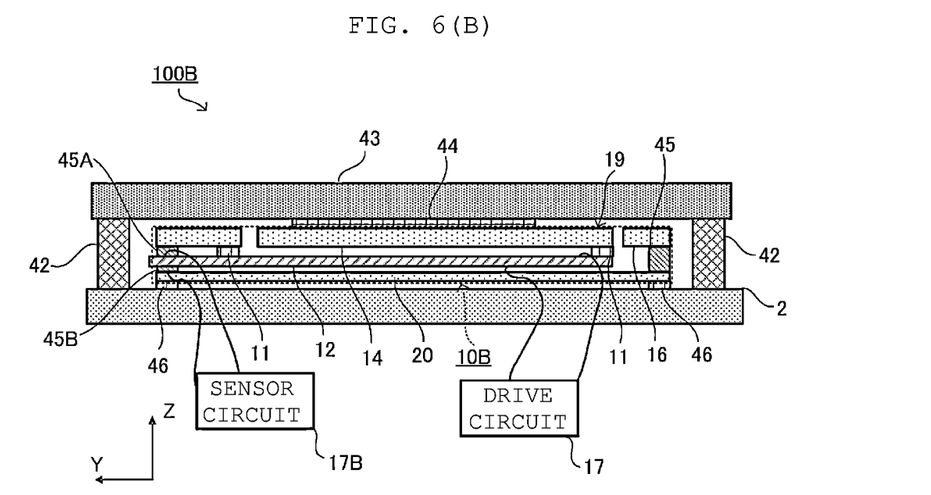
FIG. 6(B) is a sectional view of a vibration device 100B including a vibration unit 10B (a sectional view corresponding to line I-I illustrated in FIG. 6(A)).
Figure 7:
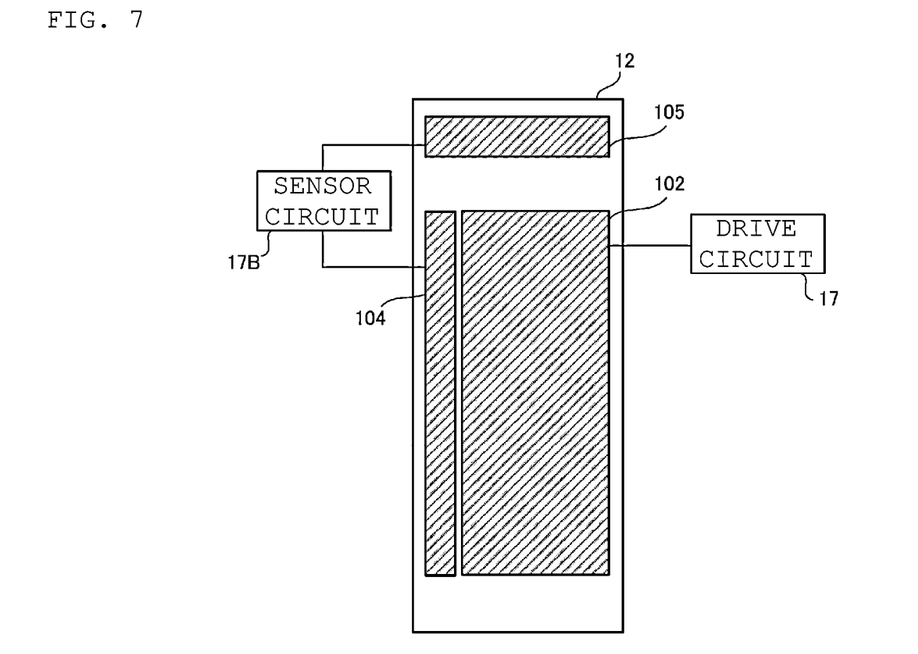
FIG. 7 is a diagram illustrating a connection relationship between an electrode and a circuit.

Next, FIG. 6(A) is a bottom view of a vibration unit 10B according to a second modification. FIG. 6(B) is a sectional view of a vibration device 100B including a vibration unit 10B (a sectional view corresponding to line I-I illustrated in FIG. 6(A)). FIG. 7 is a diagram illustrating a connection relationship between an electrode and a circuit. The same configuration as that of the vibration unit 10 will be denoted by the same reference symbol, and the description thereof will be omitted.

In the above-described vibration unit 10, the second end of the vibration film 12 is connected to the second end of the vibration part 14 in the Y-axis direction through the connection member 11. In the vibration unit 10B, however, a length of the vibration film 12 in the Y-axis direction is long, and a second end of the vibration film 12 is connected to a second end of the frame member 16 in the Y-axis direction through a connection member 45A. In addition, the second end of the vibration film 12 is connected to the protective film 20 through a connection member 45B.

A ground electrode (not illustrated) is formed on a first main surface (upper surface) of the vibration film 12. As illustrated in FIGS. 6(A) and 7, a plurality of electrodes are formed on a second main surface (lower surface) of the vibration film 12. A driving electrode 102 and a first sensor electrode 104 are formed on the second main surface of the vibration film 12 between positions where the two connection members 11 are arranged in plan view. A second sensor electrode 105 is formed on the second main surface of the vibration film 12 at a position overlapping with the connection member 45A in plan view.

The driving electrode 102 and the first sensor electrode 104 are arranged in parallel in the Y-axis direction. The driving electrode 102 and the first sensor electrode 104 are long in the Y-axis direction and short in the X-axis direction. A width of the driving electrode 102 is longer than a width of the first sensor electrode 104. A length of the driving electrode 102 in the Y-axis direction is the same as a length of the first sensor electrode 104 in the Y-axis direction. The second sensor electrode 105 is short in the Y-axis direction and long in the X-axis direction. However, the length of the driving electrode 102 in the Y-axis direction is not necessarily the same as the length of the first sensor electrode 104 in the Y-axis direction.

As illustrated in FIG. 7, the driving electrode 102 is connected to the drive circuit 17. The first sensor electrode 104 and the second sensor electrode 105 are connected to a sensor circuit 17B. The sensor circuit 17B detects a voltage corresponding to a charge generated in each of the first sensor electrode 104 and the second sensor electrode 105.

The vibration film 12 is made of, for example, PVDF as described above. The PVDF has a component d31 of an output of a charge in accordance with expansion and contraction in the planar direction and a component d33 of an output of a charge in accordance with expansion and contraction in the thickness direction. The first sensor electrode 104 detects the component d31. The second sensor electrode 105 detects the component d33.

When a user performs a pushing operation on the touch panel 43, the vibration part 14 is also pushed in with the connection member 44 interposed therebetween. Therefore, a portion of the vibration film 12 sandwiched between the connection member 45A and the connection member 45B is compressed in the thickness direction. Therefore, the sensor circuit 17B can determine that the pushing operation has been performed on the touch panel 43 when an absolute value of an output of the second sensor electrode 105 becomes equal to or larger than a predetermined threshold.

A case where a person is located in front of an operation target and operates the operation target with the left and right arms will be considered. The vibration part 14 is bent by a pushing operation. Therefore, the vibration film 12 expands and contracts in the planar direction. For example, when the pushing operation is performed with any finger of one of the right and left arms on the side where the first sensor electrode 104 is arranged in plan view, the side of the vibration film 12 on which the first sensor electrode 104 is arranged expands or contracts due to a force of a horizontal component out of a force of the pushing operation. On the other hand, when the pushing operation is performed with a finger of any of the right and left arms opposite to the above arm, a direction of the force of the horizontal component is reversed. The side of the vibration film 12 on which the first sensor electrode 104 is arranged reversely contracts or expands. Thus, an output polarity of the component d31 is reversed depending on whether the pushing operation is performed with the left arm or the pushing operation is performed with the right arm.

Therefore, the sensor circuit 17B can determine which one of the left and right arms has been used to perform the operation by determining the output polarity of the first sensor electrode 104. In addition, when the user rotates a finger on the surface of the touch panel 43 while performing the pushing operation on the touch panel 43, the output polarity of the first sensor electrode 104 changes. Therefore, the sensor circuit 17B can determine a rotation operation and a rotation speed thereof by determining the change in the output polarity of the first sensor electrode 104.

In addition, the sensor circuit 17B preferably determines the polarity using only a section in which the absolute value of the output of the second sensor electrode 105 is equal to or larger than the threshold among the outputs of the first sensor electrodes 104. As a result, the sensor circuit 17B can determine a polarity of the first peak since the user performs the pushing operation on the touch panel 43. Thus, the sensor circuit 17B can determine the pushing operation with a high accuracy.

Note that an absolute value of the output of the first sensor electrode 104 changes depending on the force of the horizontal component out of the force of the pushing operation on the touch panel 43. On the other hand, the absolute value of the output of the second sensor electrode 105 changes depending on a force of a vertical component out of the force of the pushing operation. Thus, the sensor circuit 17B can detect the force of the pushing operation with a high accuracy by using the outputs of the first sensor electrode 104 and the second sensor electrode 105. In addition, the sensor circuit 17B preferably determines whether or not the pushing operation has been performed based on the output of the second sensor electrode 105, and determines the amount of pushing based on the output of the first sensor electrode 104.

In addition, when the vibration device 100B is tilted, the vibration part 14 is also tilted. When the vibration part 14 is tilted, the vibration film 12 also expands and contracts. When the side of the vibration part 14 on which the first sensor electrode 104 is arranged is tilted toward the lower surface in plan view, the side of the vibration film 12 on which the first sensor electrode 104 is arranged expands. When the side of the vibration part 14 opposite to the side on which the first sensor electrode 104 is arranged is tilted toward the lower surface in plan view, the side of the vibration film 12 on which the first sensor electrode 104 is arranged contracts. As a result, the sensor circuit 17B can also detect the tilt and a direction of the tilt of the vibration device 100B.

Note that, for example, in a case where a touch sensor such as a capacitance sensor is provided on the touch panel 43, the sensor circuit 17B may determine the presence or absence of the pushing operation performed by the user from an output of the touch sensor. In this case, the second sensor electrode 105 is not essential.

In addition, the above example is configured such that the driving electrode 102 configured to expand and contract the vibration film 12 and the first sensor electrode 104 configured to detect the component d31 are separately provided. However, the electrode configured to expand and contract the vibration film 12 and the electrode configured to detect the component d31 may be the same one electrode. In this case, the vibration device 100B includes a switch or the like configured to connect the drive circuit 17 and the sensor circuit 17B to the one electrode in a switchable manner.

A technical idea of the vibration device 100B according to the second modification is summarized as follows.

(1) A vibration device including: a vibration part having a flat plate shape; a fixing member; a support part connecting the vibration part and the fixing member; a piezoelectric film connected to the vibration part and extending across the vibration part and the fixing member in a tensioned state; a pushing operation detector detecting a pushing operation; a driver expanding and contracting the piezoelectric film in a planar direction; and an expansion/contraction detector detecting expansion and contraction of the piezoelectric film in the planar direction.

(2) The vibration part is connected to an operation target on which a user performs the pushing operation.

(3) The pushing operation detector detects the pushing operation by detecting deformation of the piezoelectric film in a thickness direction by an electrode formed on the piezoelectric film.

(4) The expansion/contraction detector detects the expansion and contraction in the planar direction by an electrode formed in a length direction of the piezoelectric film.

(5) The expansion/contraction detector detects whether an arm that has performed the pushing operation is a right arm or a left arm based on a polarity of a voltage detected by the electrode.

(6) The expansion/contraction detector detects a tilt of the vibration device based on a polarity of a voltage detected by the electrode.

It should be considered that the description of the present embodiment are illustrative in all aspects and not restrictive. The scope of the present invention is defined not by the above embodiment but by the scope of the claims. Further, the scope of the present disclosure is intended to include meanings equivalent to the scope of the claims and all modifications within the scope.

For example, the fixing member has been illustrated as the frame member in the present embodiment, but does not necessarily has a frame shape. Any shape may be used as long as the fixing member is connected to the vibration film and the vibration part and can fix the vibration film and the vibration part.

In addition, a shape of the vibration part is not limited to the shape described in the present embodiment. The vibration part may have any shape as long as being connected to the vibration film and vibrating in response to the vibration of the vibration film.

Figure 8:
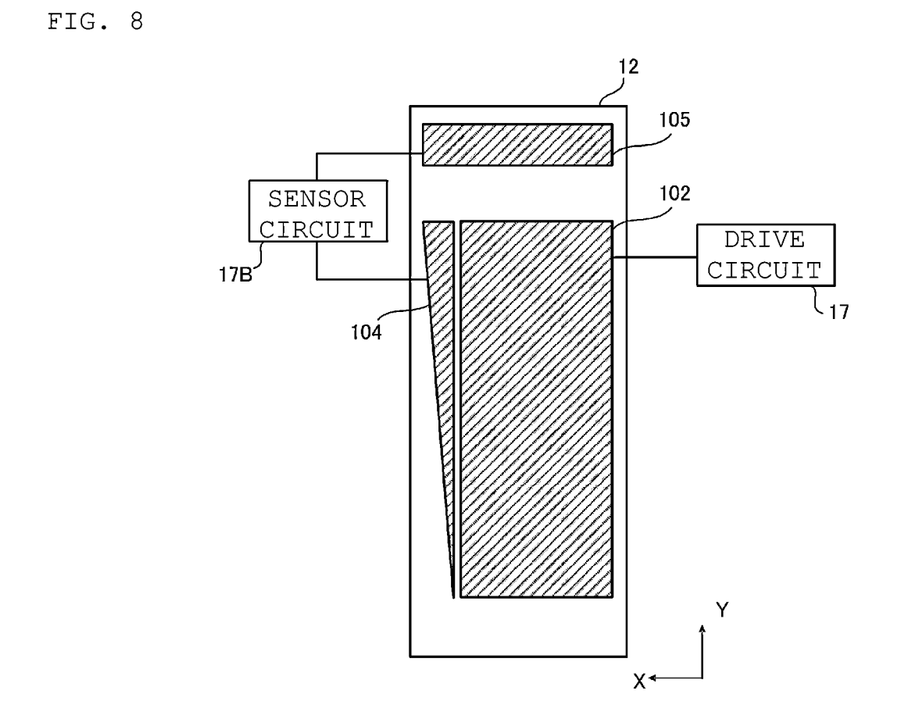
FIG. 8 is a diagram illustrating a connection relationship between the electrode and the circuit.

The first sensor electrode 104 according to the second modification can also have a configuration as illustrated in FIG. 8. FIG. 8 is a diagram illustrating a connection relationship between the electrode and the circuit. In the example of FIG. 8, a width of the first sensor electrode 104 monotonously increases or decreases in the longitudinal direction of the vibration film 12. An absolute value of an output of the first sensor electrode 104 changes depending on a force of a horizontal component out of a force of a pushing operation on the touch panel 43. In a shape illustrated in FIG. 8, the absolute value of the output of the first sensor electrode 104 changes depending on a force in the X-axis direction out of the force of the pushing operation on the touch panel 43. As a result, the sensor circuit 17B can detect a change of a position in the X direction among pushing positions of the touch panel 40. Therefore, the sensor circuit 17B can determine a rotation operation and a rotation speed thereof with a higher accuracy by determining a change in the output of the first sensor electrode 104.

DESCRIPTION OF REFERENCE SYMBOLS

2: Housing
10, 10A, 10B: Vibration unit
12: Vibration film
14: Vibration part
14B: Extension part
15: Support part
16: Frame member
17: Drive circuit
17B: Sensor circuit
18: First main surface
19: Second main surface
20: Protective film
21: First opening
22: Second opening
42: Cushioning material
43: Touch panel
11, 44, 45, 45A, 45B, 46: Connection member
100: Vibration device
100B: Vibration device
102: Driving electrode
104: First sensor electrode
105: Second sensor electrode

The invention claimed is:

1. A vibration device comprising:
a vibration part having a flat plate shape and connected to an operation target on which a user performs a pushing operation;
a fixing member;
a support part connecting the vibration part and the fixing member; and
a vibration film connected to the vibration part and the fixing member, extending across the vibration part and the fixing member in a tensioned state, and constructed to vibrate in a planar direction,
wherein a resonance frequency F of the vibration device is expressed as $F=(1/2\pi)\cdot((K+k)/(M+m))^{1/2}$, where a weight of the operation target is M, a weight of the vibration part is m, a spring constant of the vibration film is K, and a spring constant of the support part is k.

2. The vibration device according to claim 1, wherein the resonance frequency F is in a range of 100 to 250 Hz.

3. The vibration device according to claim 1, wherein a weight of the operation target is equal to or more than twice a weight of the vibration part.

4. The vibration device according to claim 1, wherein the operation target is a touch panel.

5. The vibration device according to claim 1, wherein a weight of the operation target is equal to or more than twice a weight of the vibration part.

6. A vibration device comprising:
a vibration part having a flat plate shape and connected to an operation target on which a user performs a pushing operation;
a fixing member;
a support part connecting the vibration part and the fixing member; and
a vibration film connected to the vibration part and the fixing member, extending across the vibration part and the fixing member in a tensioned state, and constructed to vibrate in a planar direction,
wherein the vibration part includes a portion arranged inside the fixing member in plan view and an extension part extending outward from the fixing member.

7. The vibration device according to claim 6, wherein the vibration part is connected to the operation target by the extension part.

8. A vibration device comprising:
a vibration part having a flat plate shape and connected to an operation target on which a user performs a pushing operation;
a fixing member;
a support part connecting the vibration part and the fixing member;
a vibration film connected to the vibration part and the fixing member, extending across the vibration part and the fixing member in a tensioned state, and constructed to vibrate in a planar direction; and
a sensor electrode on the vibration film, the sensor electrode constructed to detect an output of a charge generated in accordance with a force of the pushing operation on the operation target.

9. The vibration device according to claim 8, wherein the output of the charge generated in accordance with the force of the pushing operation is a horizontal component of the force of the pushing operation on the operation target.

10. The vibration device according to claim 9, wherein the sensor electrode is a first sensor electrode, and the vibration device further comprises a second sensor electrode that detects an output of a charge generated in accordance with a vertical force of the force of the pushing operation on the operation target.

11. The vibration device according to claim 10, wherein a width of the first sensor electrode monotonously increases or decreases along a longitudinal direction of the vibration film.

12. The vibration device according to claim 9, wherein a width of the sensor electrode monotonously increases or decreases along a longitudinal direction of the vibration film.

* * * * *